(12) United States Patent
Rodrigo et al.

(10) Patent No.: US 8,889,754 B2
(45) Date of Patent: Nov. 18, 2014

(54) POLYMER FOAM AND FOAM ARTICLES FOR FIRE PROTECTION

(75) Inventors: Pulahinge Don Dayananda Rodrigo, Doncaster (AU); Susan Wan Yi Wong, Murrumbeena (AU); Yi-Bing Cheng, East Burwood (AU); Kevin William Thomson, Nunawading (AU); Robert Arthur Shanks, Glen Iris (AU); Vanja Pasanovic-Zujo, Ringwood East (AU)

(73) Assignee: Polymers CRC Ltd, Notting Hill, Victoria (AU)

( * ) Notice: Subject to any disclaimer, the term of this patent is extended or adjusted under 35 U.S.C. 154(b) by 1155 days.

(21) Appl. No.: 12/599,211

(22) PCT Filed: May 5, 2008

(86) PCT No.: PCT/AU2008/000612
§ 371 (c)(1),
(2), (4) Date: Oct. 24, 2011

(87) PCT Pub. No.: WO2008/134803
PCT Pub. Date: Nov. 13, 2008

(65) Prior Publication Data
US 2012/0029103 A1 Feb. 2, 2012

(30) Foreign Application Priority Data
May 7, 2007 (AU) ............................. 2007902415

(51) Int. Cl.
| | | |
|---|---|---|
| C08G 18/16 | (2006.01) | |
| C08J 9/00 | (2006.01) | |
| C08G 18/00 | (2006.01) | |
| C04B 35/63 | (2006.01) | |
| C04B 35/524 | (2006.01) | |
| C08L 75/04 | (2006.01) | |
| C04B 26/16 | (2006.01) | |
| C04B 38/06 | (2006.01) | |
| C04B 35/626 | (2006.01) | |
| C08G 18/10 | (2006.01) | |
| C09K 21/14 | (2006.01) | |
| C04B 35/634 | (2006.01) | |
| C08K 3/32 | (2006.01) | |
| C04B 111/28 | (2006.01) | |
| C08K 5/00 | (2006.01) | |
| C08G 101/00 | (2006.01) | |
| C08K 3/04 | (2006.01) | |
| C08K 7/22 | (2006.01) | |
| C08K 3/38 | (2006.01) | |
| C08K 3/36 | (2006.01) | |

(52) U.S. Cl.
CPC ............. *C09K 21/14* (2013.01); *C04B 2235/94* (2013.01); *C04B 2235/3293* (2013.01); *C04B 2235/3454* (2013.01); *C04B 2235/349* (2013.01); *C04B 35/6306* (2013.01); *C08J 2375/04* (2013.01); *C08K 3/32* (2013.01); *C04B 2235/3284* (2013.01); *C04B 2111/285* (2013.01); *C04B 35/524* (2013.01); *C08K 5/0066* (2013.01); *C08G 2101/00* (2013.01); *C08L 75/04* (2013.01); *C08K 3/04* (2013.01); *C04B 2235/447* (2013.01); *C04B 26/16* (2013.01); *C04B 2235/449* (2013.01); *C04B 38/064* (2013.01); *C04B 35/6269* (2013.01); *C04B 2235/3427* (2013.01); *C08G 18/10* (2013.01); *C04B 2235/9615* (2013.01); *C08K 7/22* (2013.01); *C08J 9/0038* (2013.01); *C04B 2235/3409* (2013.01); *C04B 35/63456* (2013.01); *C08J 9/0066* (2013.01); *C08K 3/38* (2013.01); *C04B 2235/96* (2013.01); *C04B 2235/425* (2013.01); *C08K 3/36* (2013.01)
USPC ............................ 521/106; 521/155; 521/170

(58) Field of Classification Search
USPC .......................................... 521/106, 170, 155
See application file for complete search history.

(56) References Cited

U.S. PATENT DOCUMENTS

| | | | | |
|---|---|---|---|---|
| 4,698,369 | A | * | 10/1987 | Bell ................................ 521/99 |
| 5,023,280 | A | * | 6/1991 | Haas et al. ..................... 521/106 |
| 5,182,309 | A | * | 1/1993 | Hutzen .......................... 521/99 |
| 5,837,742 | A | * | 11/1998 | Fishback ........................ 521/172 |
| 6,552,098 | B1 | * | 4/2003 | Bosch et al. ................... 521/170 |
| 6,602,925 | B1 | * | 8/2003 | Van Den Bosch et al. ..... 521/99 |

(Continued)

FOREIGN PATENT DOCUMENTS

| | | |
|---|---|---|
| AU | 200116415 B2 | 8/2001 |
| FR | 2873300 A1 | 7/2004 |
| FR | 2873300 A1 | 1/2006 |
| GB | 2226033 A | 6/1990 |
| GB | 2251623 A | 7/1992 |
| JP | 2008199769 | 8/1996 |

(Continued)

OTHER PUBLICATIONS

International Search Report for International Patent Application No. PCT/AU2008/000612 (Jun. 2, 2008).
Supplementary European Search Report for European Patent Application No. 08733437, dated Nov. 28, 2013.

*Primary Examiner* — Melissa Rioja
(74) *Attorney, Agent, or Firm* — LeClairRyan, a Professional Corporation

(57) ABSTRACT

The invention provides a cellular polyurethane foam composition for forming a cellular ceramic under fire conditions, the composition comprising: at least 40% by weight based on the total weight of the composition of a polyurethane; from 10% to 40% by weight based on the total weight of the composition of silicate mineral filler; from 5% to 20% by weight based on the total weight of the composition of at least one inorganic phosphate that forms a liquid phase at a temperature of no more than 800° C.; from 0.1% to 10% by weight based on the total weight of the composition of a heat expandable solid material; and wherein the total proportion of inorganic components constitutes in the range of from 20% to 60% by weight of the total composition.

15 Claims, No Drawings

(56) References Cited

U.S. PATENT DOCUMENTS

| | | |
|---|---|---|
| 2002/0020827 A1* | 2/2002 | Munzenberger et al. ......... 252/3 |
| 2004/0106701 A1 | 6/2004 | Fichou et al. |
| 2004/0116545 A1* | 6/2004 | Jakobstroer et al. .......... 516/115 |
| 2006/0068201 A1* | 3/2006 | Alexander et al. ............. 428/357 |
| 2007/0246240 A1* | 10/2007 | Alexander et al. .............. 174/36 |
| 2008/0203348 A1 | 8/2008 | Laoutid et al. |

FOREIGN PATENT DOCUMENTS

| | | |
|---|---|---|
| JP | 10-008595 | 1/1998 |
| JP | 2007-191554 | 8/2007 |
| WO | 2005/095545 A1 | 10/2005 |
| WO | WO-2005095545 A1 * | 10/2005 |
| WO | 2007/050000 A1 | 5/2007 |

* cited by examiner

POLYMER FOAM AND FOAM ARTICLES FOR FIRE PROTECTION

This application is a national stage application under 35 U.S.C. §371 from PCT Application No. PCT/AU2008/000612, filed May 5, 2008, which claims the priority benefit of Australian Application No. 2007902415, filed May 7, 2007.

FIELD

The present invention relates to polyurethane-based foam compositions and articles comprising polyurethane based foams. In particular the invention relates to polyurethane foam compositions and articles for providing passive fire protection. The invention also relates to the preparation of such compositions and to their use.

BACKGROUND

Passive fire protection of structures and components is an area that is receiving increased attention. In this context the term "passive" means the use of materials that impart a barrier to fire and the results of fire such as intense heat. Passive fire protection systems are used extensively throughout the building and construction, mining and infrastructure, defense and transportation industries and typically function by counteracting the movement of heat and/or smoke, by sealing holes, by prolonging stability of structures to which the system is applied and/or by creating thermal and/or physical barriers to the passage of fire, heat and smoke.

Typically, in some passive fire protection applications, for example, gap filling for access spaces in a structure, gap-filling in wall penetrations for pipes and ducts, gap filling between panels, expansion joints, thermal insulation for ducts and pipes, door cores, seals in various applications, coatings on building panels, barrier coatings on various applications, there is a requirement for the material to exhibit minimal shrinkage and good strength at the high temperatures experienced in a fire. Foams have advantages over solid materials that in this case include lower densities for weight reduction, better acoustic and thermal insulation properties and greater flexibility.

When exposed to a fire (generally up to and exceeding about 1000° C.) polyurethane foams soften, collapse and finally pyrolyze leaving nothing or very little carbonaceous residue. Hence the polyurethane foam is unable to continue to fill the volume it occupied prior to exposure to fire making it incapable of functioning as an effective fire barrier. One way of making a fire barrier material of polyurethane base is to incorporate additives that can form and retain a solid residue of near identical shape and size with sufficient cohesiveness and strength at all stages on exposure to fire. Polyurethane foams must therefore contain inorganic components that confer the required fire barrier properties by providing a porous ceramic barrier to the passage of the fire.

Foams used in passive fire protection applications may be prepared by three approaches.

One approach involves impregnating a polyurethane foam structure with inorganic components that will generate a refractory residue on exposure to fire. British Patent 2251623 (Wexler et al.) describes a fire resistant sealing material prepared by impregnating foam, such as polyurethane foam, with a composition containing inorganic filler, sintering agent and optionally other additives. This approach is expensive as the process of infusion involves a separate operation and necessitates the subsequent removal of the aqueous carrier used in impregnation of the inorganic components. Foams prepared in this way can be wet, sticky and difficult to handle.

Another approach, described for example in U.S. Pat. Nos. 6,313,186 and 6,610,756, involves forming an inorganic foam containing a physically integrated polyurethane. These materials tend to have high density, low compressibility and inherent brittleness.

Another approach involves making the polyurethane foam in the presence of inorganic compounds that react to provide a ceramic foam with the required properties upon exposure to fire. Our International Patent Publication WO 2004/035711 describes such an approach in which the fire resistant polymer composition contains at least 15% by weight based on the total weight of the composition of a polymer base composition comprising at least 50% by weight of an organic polymer; at least 15% by weight based on the total weight of the composition of a silicate mineral filler; and at least one source of fluxing oxide, wherein after exposure to an elevated temperature experienced under fire conditions, the fluxing oxide is present in an amount of from 1 to 15% by weight of the residue.

In the case of low density polyurethane foams the desirability for fire barrier properties to be maintained under fire conditions has been extremely difficult to meet. Intumescent foams have been used that expand under fire conditions but any further loss of density generally results in disintegration of the product under fire condition or the formation of a residue of such poor strength as to provide no significant barrier to the passage of fire.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of this application.

SUMMARY OF THE INVENTION

We have found that foam compositions that include a combination of polyurethane, inorganic phosphate, and certain combinations of filler including a heat expandable solid material can form excellent foams with relatively low densities and have a performance sufficient to present a useful barrier to propagation of fires through structures and building penetrations containing the composition. The foamed composition of the invention provides a fire barrier by progressively converting to a ceramic foam with sufficient cohesiveness and strength while maintaining a shape and size comparable to the original foam to provide an effective barrier on exposure to fire.

Accordingly, we provide a composition for forming a cellular foam which transforms to a cellular ceramic under fire conditions, the composition comprising:
  at least 40% by weight based on the total weight of the composition of a polyurethane;
  10 to 40% by weight based on the total weight of the composition of silicate mineral filler;
  5-20% by weight based on the total weight of the composition of at least one inorganic phosphate that forms a liquid phase at a temperature of no more than 800° C.;
  0.1% to 10% (preferably 0.5-10%) by weight based on the total weight of the composition of a heat expandable solid material; and
wherein the total proportion of inorganic components constitutes in the range of from 20 to 60% by weight of the composition.

In a further aspect of the invention we provide a method of forming a cellular polyurethane material comprising forming a mixture of a polyol component and an isocyanate component in the presence of an inorganic component and foaming the composition to form a polyurethane foam, optionally in the presence of a blowing agent, wherein the inorganic components constitute in the range of from 20 to 60% by weight of the foamed composition and the foam composition comprises:

- an amount of polyol and isocyanate to provide at least 40% by weight based on the total weight of the final composition of a polyurethane; from 10% to 40% by weight based on the total weight of the final composition of a silicate mineral filler;
- from 5 to 20% by weight based on the total weight of the final composition of at least one inorganic phosphate that forms a liquid phase at a temperature of no more than 800° C.; and
- from 0.1% to 10% (preferably from 0.5% to 10%) by weight based on the total weight of the final composition of a heat expandable solid material.

Typically at least the major portion of the inorganic components are mixed with the polyol component.

In a further aspect of the invention we provide an article for gap filling, thermal insulation and fire barrier applications comprising the above-described polyurethane foam. Examples of such applications include gap filling for access spaces in structures, gap-filling in wall penetrations for pipes and ducts, gap filling between panels, expansion joints, thermal insulation for ducts and pipes, door cores, seals in various applications, coatings on building panels and barrier coatings on various applications.

DETAILED DESCRIPTION

The term inorganic filler is used herein to refer to compounds which are solid at room temperature and lack C—H bonds. All carbon compounds are sometimes erroneously considered to be organic but the requirement for C—H bonds to be classified organic is applicable to the present application. Many compounds that contain carbon are thus included within the definition of inorganic. Inorganic carbon containing compounds include graphite, carbonates and fullerenes to name a few prominent examples that lack C—H bonds.

The term "foam" is used herein to refer to polyurethanes in which a gaseous phase has been deliberately introduced through methods known in the art such as mechanical means, introduction of gas or in situ formation of a gas phase.

Throughout the description and the claims of this specification the word "comprise" and variations of the word, such as "comprising" and "comprises" is not intended to exclude other additives, components, integers or steps.

The composition of the present invention comprises from 0.1% to 10% (preferably from 0.5 to 10%) by weight of the total composition of a heat expandable solid material. The more preferred amounts of heat expandable solid material are from 1 to 10% and still more preferably from 1 to 7% and most preferably from 1 to 5% by weight of the total foam composition. During the conversion of the foam to a ceramic the heat expandable solid material assist in maintaining the volume and shape by expanding and compensating for loss of the organic matrix. The amounts of heat expandable solid material in excess of about 10% by weight of the total composition lead to too many weak regions in the structure of the ceramic residue making it disintegrate easily at high temperatures. The amounts of heat expandable solid material less than about 0.1% by weight of the total composition are inadequate to compensate for volume shrinkage caused by the pyrolysis of the polymer component.

Examples of the heat expandable solid material include unexpanded beneficiated flakes of vermiculite, unexpanded perlite, hydrobiotite, unexpanded foam clay, expandable graphite and water-swelling synthetic tetrasilicic fluorine type mica (described in U.S. Pat. No. 3,001,571). The heat expandable solid material is generally in the form of particles and is preferably of sufficient fineness so that the foam composition as a whole is easily formed. Materials may be added which intercalate between plates of e.g. vermiculite and aid in expansion.

The use of a silicate heat expandable solid material has a significant advantage that the silicate contributes to the formation of silicate based ceramic formed in fire conditions. Accordingly the silicate may expand to assist in maintaining the volume and shape of the material during formation of a ceramic and also assist by virtue of its interaction with components such as the inorganic phosphate in strengthening the resulting ceramic.

The most preferred heat expandable solid material is expandable graphite and preferably expandable graphite having an acid treatment. The expandable graphite will typically have an expansion ratio of from 100 to 300% and may be of mesh size of, for example, from 20 to 325 BSS mesh. In the case of particles of expandable graphite of 50 mesh and larger, the content is preferably up to 5% by weight of the final foam composition. It is preferred that the expandable graphite is of particle size no coarser than 80 mesh. Coarser particles also typically reduce the strength of the ceramic residue when compared with particles no coarser than 80 mesh, particularly at high temperatures of about 1000° C. or more as the structure contains larger and less uniform weak regions in the ceramic structure.

The expansion ratio varies with the particle size and hence the desired amount of the heat expandable solid material depends on the particle size as well.

It is preferred that the heat expandable solid material expands during the combustion process prior to complete polymer degradation to retain the foam's net shape.

The heat expandable solid material will preferably commence expansion at a temperature of no more than 250° C. and preferably no more than 200° C. The heat expandable solid material may comprise a mixture of two or more heat expandable components. The composition may thus include one or more components which commence expansion at a relatively low temperature of for example no more than 200° C. and one or more components which expand at a higher temperature of, for example, at least 250° C. In this way the compositions of the invention may optionally provide controlled expansion over a range of temperatures so that expansion occurs during the formation of liquid components but prior to formation of a rigid ceramic. Typically the expansion will commence at a temperature of no more than 200° C. and will be substantially complete at a temperature of 700° C. (under the slow heating regime used for determining dimensional stability described in the Examples hereto).

The compositions of the invention contain a silicate mineral in an amount of from 10 to 40% by weight based on the total weight of the polyurethane foam composition. The silicate mineral is preferably present in an amount of 15 to 40% by weight of the total composition and most preferably from 15 to 30% by weight based on the total weight of the polyurethane foam composition. Such fillers typically include alumino-silicates (e.g. kaolinite, montmorillonite, pyrophilite—commonly known as clays), alkali alumino-silicates (e.g. mica, felspar, spodumene, petalite), magnesium silicates (e.g. talc) and calcium silicates (e.g. wollastonite). Mixtures of two or more different silicate mineral fillers may be used. Such fillers are commercially available. Silicon dioxide (silica) is not a silicate mineral filler in the context of the present invention.

The silicate mineral filler may be surface treated with a silane coupling agent in order to enhance its compatibility with other materials present in the compositions of the present invention. Where the heat expandable solid material is a silicate mineral it will also contribute to the content of the total silicate mineral component.

Most silicate minerals consist of particles of high aspect ratio. They are either platy or acicular in nature. The silicate mineral fillers of high aspect ratio are preferred as they provide an interlocking skeleton to the ceramic structure formed thereby improving the strength and reducing the shrinkage of the ceramic formed. It is also important to select a silicate mineral filler that is sufficiently refractory in the range of temperatures the composition of the invention is expected to perform as a fire barrier so that it does not soften too much and cause the ceramic structure to collapse. While providing a skeleton to the ceramic formed, most of the silicate mineral particles interact with other components such as the inorganic phosphate to form a fine dispersion of transient liquid located at the edges of the silicate mineral particles which facilitate sintering and thereby strengthening the resulting ceramic.

It has been found that for formation of a desirable ceramic residue the total inorganic filler content in the foam has to be at least about 20% by weight based on the total weight of the polyurethane foam composition and the amount of silicate mineral filler has to be at least about 50% by weight based on the total weight of the filler mixture that is at least 10% by weight of the total polyurethane foam composition. The upper limit of the total filler content is determined by the maximum amount that can be easily incorporated by conventional methods of mixing and it is about 60% by weight based on the total weight of the polyurethane foam composition. This requirement together with the need to have one or more liquid forming inorganic fillers such as the inorganic phosphate in an amount of at least one fourth and more preferably at least one third by weight of the total filler content limits the maximum desirable amount of silicate mineral to about 40% by weight based on the total weight of the polyurethane foam composition.

The composition of the invention comprises at least one inorganic phosphate that forms a liquid phase at a temperature of no more than 800° C. in a total amount of said inorganic phosphate in the range of from 5 to 20% by weight of the total polyurethane foam composition. The said inorganic phosphate preferably constitutes in the range of from 8 to 20% by weight of the total polyurethane foam composition and most preferably from 10 to 20% by weight based on the total weight of the polyurethane foam composition.

Preferably the composition will contain from 5 to 20% (preferably from 8 to 20% most preferably from 10 to 20%) of inorganic phosphates which form a liquid phase at a temperature of no more than 500° C. Where there is more than one inorganic phosphate then the total amount of inorganic phosphates that form a liquid phase at a temperature of less than 800° C. (preferably less than 500° C.) is in the specified range. Specific examples of inorganic phosphates of this type include ammonium phosphate, ammonium polyphosphate and ammonium pyrophosphate, calcium dihydrogen phosphate, monopotassium phosphate, dipotassium phosphate, disodium pyrophosphate and sodium hexametaphosphate. More preferred inorganic phosphates are ammonium phosphate, ammonium polyphosphate and ammonium pyrophosphate. These inorganic phosphates decompose and form a liquid phase (containing phosphorous) at temperatures in the range of approximately 200 to 800° C.

Phosphates such as boron phosphate (MPt>1200° C.) which have a relatively high melting point and hence do not form a liquid phase at a temperature of no more than 800° C. (preferably no more than 500° C.), do not form part of the inorganic phosphate component required by the invention and, while they may be present as additional fillers, they generally do not contribute to the transient liquid phase which is reactive with the mineral silicate. Ammonium polyphosphate offers significant advantages in the compositions of the invention and is the most preferred inorganic phosphate. Accordingly in a particularly preferred embodiment the composition of the invention comprises from 5 to 20% by weight of the total polyurethane foam composition (more preferably from 8% to 20% by weight) of ammonium polyphosphate (APP).

Significant advantages are provided by inorganic phosphates that form a liquid phase at relatively low temperatures under fire conditions. We have found that the liquid phase formed from the inorganic phosphate component in the composition of this invention is a transient liquid phase. Its interaction with other components of the composition results in formation of solid phases and transformation of the composition into a solid ceramic at high temperature. Inorganic phosphates, and in particular systems based on ammonium polyphosphate, have the significant advantage of maintaining the integrity of the composition in combination with the other components of the composition of the invention. In a particularly preferred embodiment of the invention the inorganic phosphate liquid forming component is chosen to provide, in combination with other components, properties (particularly relatively high viscosity) which will entrap an adequate amount of gas pores and maintain the shape and dimensions of the product. The inorganic phosphate component in combination with other components, allows expansion of the heat expandable solid material while the composition comprises a portion of the liquid phase and transforms into a solid ceramic following expansion so that expansion does not unduly disrupt the ceramic or cause it to disintegrate.

We have found that the select range of components of the present invention allows the liquid components formed under fire conditions to maintain a sufficiently high viscosity so that the composition does not flow while at the same time, providing the flexibility to allow expansion of the heat expandable solid material and to maintain shape and volume by compensating for the loss of combustible materials.

The inorganic phosphate component also significantly improves the strength of the resulting ceramic by providing a degree of adhesion between particulates of inorganic materials (particularly the silicate mineral filler) on formation of a ceramic.

The composition of the invention contains at least 40% by weight based on the total weight of the polyurethane composition of a polyurethane. The upper limit for the amount of polyurethane in the fire resistant composition tends to be influenced by the desired properties of the formulated composition. If the amount of the polyurethane exceeds about 80% by weight of the overall composition, it is unlikely that a cohesive, non-collapsing residue will be formed during a fire situation.

Polyurethanes are formed by reaction of an isocyanate component (including derivatives of isocyanates) with at least one component comprising an active-hydrogen containing functional group such as hydroxyl, amine, carboxylic acid, thiol or other active-hydrogen containing group, or by self-reaction with other isocyanates, generally in the presence of a catalyst and optionally other additives of the type known in the art. These two components are often referred to as 'iso' and 'poly', respectively, and together as 'polyurethane system', or simply as 'system'.

The products of these reactions are referred to as polyurethanes as a class of polymer even though they may contain few or no urethane groups. When specified more precisely polyurethanes are referred to by their particular functional group name. The general description of a polyurethane arises because these other functional group reactions often take place as side-reactions in polyurethane formation. The unsaturated C═N bond in an isocyanate is activated for nucleophilic attack by alcohols, carboxylic acids, water, amines, and thiols.

Examples of products and by-products in generic polyurethanes are:
Urethane (isocyanate and hydroxyl)
Allophonate (isocyanate with urethane, provides a crosslink))
Amine (isocyanate and water via spontaneous decarboxylation of a carbamic acid intermediate)
Urea (isocyanate and amine, where the amine is either from the reaction with water or added as a faster reacting species than hydroxyl)
Biuret (isocyanate with urea, provides a crosslink)
Acylurea (isocyanate with amide, provides a crosslink)
Amide (isocyanate with carboxylic acid)
Uretidione (self-reaction of two isocyanate groups)
Isocyanurate (self-reaction of three isocyanate groups)

Polyurethanes include polyisocyanurates, also referred to as PIR, which use different catalysts and have a higher proportion of the isocyanate.

The formation of the various functional groups in a generic polyurethane depends on the type and concentration of reactants, temperature, catalysts and use of foaming agents.

Specific examples of polyurethanes are discussed in the reference Kirk-Othmer Concise Encyclopedia of Chemical Technology, 4th edition, R. E. Kirk and D. F. Othmer, Wiley, 1999, ISBN 0471296988 at pages 2057 to 2060 the contents of which are herein incorporated by reference.

One generic class of polyurethanes which are used in one embodiment of the invention are based on the reaction between an polyisocyanate with a polyalcohol (polyol) in the presence of a catalyst and optionally other additives of the type known in the art.

Polyurethanes may be prepared by linking monomers via the urethane reaction, they may be prepared by chain extending or cross-linking monomers, oligomers, prepolymers or polymers via the urethane reaction. In these polymers the urethane group may only constitute a small proportion of the repeat units connected by functional groups. In each case polymer formation requires difunctional reactive molecules and cross-linking requires some species with functionality of three or more. Functionality of greater than two for cross-linking may be included in the structure of either the isocyanate, alcohol or other functional groups discussed in the earlier parts of this description of generic polyurethanes.

The polyurethane structure is often modified by adding a short chain extending monomer to create regions with a higher density of the generic urethane groups that form a hard phase. Hydroxy terminated polyols and polyesters are chosen to form a hard or soft phase depending on their structure. Aromatic polyols based on bisphenol-A form a hard phase, while aliphatic polyols and polyesters form soft phases depending on their functionality. Functionality of two allows end-linking and hence chain extension giving softer foams, functionality of more than two creates polyurethanes whose hardness increases with functionality.

A first essential component of a polyurethane system is a isocyanate function-containing compound. Molecules that contain two isocyanate groups are called diisocyanates. These molecules are also referred to as monomers or monomer units, since they themselves are used to produce polymeric isocyanates that contain three or more isocyanate functional groups. Isocyanates can be classed as aromatic, such as methanediphenyl diisocyanate (MDI) or toluene diisocyanate (TDI); or aliphatic, such as hexamethylene diisocyanate (HDI) or isophorone diisocyanate (IPDI). An example of a polymeric isocyanate is polymeric methane diphenyl diisocyanate, which is a blend of molecules with two-, three-, and four- or more isocyanate groups, with an average functionality of 2.7. Isocyanates can be further modified by reacting them with a polyol to form a prepolymer. Prepolymers can be formed with isocyanate terminal groups or hydroxyl terminal groups through techniques known in the art. An isocyanate urethane prepolymer could also be formed by chain extending and/or cross-linking with amines to provided urea links.

Polyfunctional isocyanates may be used such as at least one selected from the group consisting of aliphatic (e.g. where R is aliphatic), aromatic (e.g. where R is aromatic) and cycloaliphatic (e.g. where R is cycloaliphatic) polyisocyanates and prepolymer polyisocyanates produced therefrom.

The second essential component of a polyurethane is an active hydrogen containing component which in one embodiment comprises a polyol. Molecules that contain two hydroxyl groups are called diols, those with three hydroxyl groups are called triols, et cetera. In practice, polyols are distinguished from short chain or low-molecular weight glycol chain extenders and cross linkers such as ethylene glycol (EG), 1,4-butanediol (BDO), diethylene glycol (DEG), glycerol, and trimethylol propane (TMP). Polyols may be polymers in their own right. For example they may be formed by base-catalyzed addition of propylene oxide (PO), ethylene oxide (EO) onto a hydroxyl or amine containing initiator, or by polyesterification of a di-acid, such as adipic acid, with glycols, such as ethylene glycol or dipropylene glycol (DPG). Polyols extended with PO or EO are polyether polyols. Polyols formed by polyesterification are polyester polyols. The choice of initiator, extender, and molecular weight of the polyol greatly affect its physical state, and the physical properties of the polyurethane. Important characteristics of polyols are their molecular backbone, initiator, molecular weight, primary hydroxyl group contents, functionality, and viscosity.

The polymerization reaction for preparation of polyurethanes may be catalyzed by bases such as tertiary amines, such as dimethylcyclohexylamine or triethylenediamine, or organometallic compounds, such as tin (II) octoate or dibutyltin dilaurate or bismuth octanoate. Furthermore, catalysts can be chosen based on whether they favor the urethane (gel) reaction, such as 1,4-diazabicyclo[2.2.2]octane (also called DABCO or TEDA), or the urea (blow) reaction, such as bis-(2-dimethylaminoethyl)ether, or specifically drive the isocyanate trimerization reaction, such as potassium octoate. An example of catalyst to form isocyanurate based polyurethanes is potassium 2-ethyl hexanoate.

The preparation of a foam may be carried out using a gas producing reaction or substance. Blowing agents such as water, certain halocarbons including hydrofluorocarbons such as HFC-245fa (1,1,1,3,3-pentafluoropropane) and HFC-134a (1,1,1,2-tetrafluoroethane), and hydrocarbons such as n-pentane. Such blowing agents may be incorporated into the poly side or added as an auxiliary stream. Water reacts with the isocyanate to create carbon dioxide gas, which fills and expands cells created during the mixing process. Halocarbons and hydrocarbons may be chosen such that they have boiling points at or near room temperature. Since the polymerization reaction is exothermic, these blowing agents volatilize into a gas during the reaction process. They fill and expand the cellular polymer matrix, creating a foam.

Surfactants are used to modify the characteristics of the polymer during the foaming process. They are used to regulate cell size, and stabilize the cell structure to prevent collapse and surface defects. Rigid foam surfactants are designed to produce very fine cells and a very high closed cell content. Flexible foam surfactants are designed to stabilize the reaction mass while at the same time maximizing open cell content to prevent the foam from shrinking.

The polyurethanes of the invention may be formed by known methods such as casting, moulding and extrusion into shaped articles such as sheets, panels, rods, blocks or other profiles.

In one embodiment the polyurethane is formed from an isocyanate comprising at least one of toluene di-isocyanate and methanediphenylene di-isocyanate and a polyol component comprising at least one selected from the group consisting of polyether polyols and polyester polyols.

The polyurethane may for example be formed from polyether-polyols, preferably polyoxypropylene-polyols and/or polyoxypropylene-polyoxyethylene-polyols, having a functionality of from 2 to 10 (such as a functionality of from 2 to 8 or from 2 to 6), and a molecular weight of from 100 to 8000 g/mol (such as from 150 to 8000 g/mol or from 150 to 6000 g/mol).

In one embodiment the composition comprises less than 5% carboxylic acids such as fatty acids or hydroxyl fatty acids containing, for example, at least 8 carbon atoms. More preferably the polyurethane contains less than 1% by weight carboxylic acids and most preferably is free of carboxylic acids.

The composition of the invention may optionally contain further components such as other inorganic fillers. The composition of the invention may for example comprises up to 10% by weight based on the total weight of the polyurethane foam composition of at least one of the oxides, hydroxides and carbonates of at least one metal selected from the group of magnesium, calcium and aluminium. This component is preferably present in the range of from 3 to 5% by weight based on the total weight of the polyurethane foam composition and most preferably is in the range of from 4 to 5% by weight. Glass frits are another example of an optional component.

The compositions of the present invention may optionally include up to about 5% of zinc borate. In one embodiment of the invention at least 1% by weight of zinc borate is preferred, and more preferably at least 2% by weight zinc borate is present. Zinc borate is known to decompose to provide boric oxide, which can also act as a fluxing oxide as described below.

The applicants have found that compositions having a combined proportion of inorganic phosphate and zinc borate in the overall composition greater than 20% by weight tend to experience collapse and high shrinkage when subjected to elevated temperatures which can be experienced under fire conditions. Hence, the amounts of inorganic phosphate and zinc borate (when used) are preferably adjusted to provide desired level of volume retention when heated.

Gases evolved during the decomposition of a number of the components of the composition may contribute to preventing collapse and excessive shrinkage by becoming entrapped in the cellular structure. These decomposition products include any ammonia from the inorganic phosphates such as APP, water from any metal hydroxides or zinc borate and carbon dioxide or monoxide from carbonates, as well as pyrolysis products from the polyurethane.

Under fire conditions the inorganic phosphate and zinc borate (when present) produce phosphorous oxide and boric oxide respectively. These oxides act as fluxes which melt at relatively low temperatures and react with the silicate mineral component. This reaction results in a liquid phase which can effectively bond the mineral silicate and other refractory component formed from metal oxides, hydroxides or carbonates, to form a coherent ceramic product when exposed to elevated temperatures. As a result this product exhibits desirable physical and mechanical properties. The ceramic product formed after exposure of compositions of the present invention at an elevated temperature not in excess of 1050° C. preferably has a compressive strength of at least 10 kPa. It is a distinct advantage that the compositions are non-collapsing, i.e. they remain rigid and do not undergo an excessive amount of heat induced deformation or flow.

The composition may contain a range of additives which do not interfere with the interaction of the components in forming a ceramic.

The polyurethane based foam composition of the invention typically has a density in the range of from 75 to 900 kilograms per cubic meter and preferably from 150 to 500 kilograms per cubic meters.

The composition is in the form of a foamed polyurethane composition, and the filler component of the composition will generally form an integral part of the foam structure. The foamed article of the invention may be shaped, for example, by foaming within a mould or by a continuous foam extrusion process.

The compositions of the invention may also be formulated to undergo low shrinkage following high temperature exposure. Typically, rectangular test specimens exposed to the prescribed slow heating conditions used in the examples of this specification will undergo changes in linear dimension along the length of the specimen of less than 25%, preferably less than 20% and most preferably less than 10%.

The method of determining the change in linear dimension is by measuring the length of the specimen before firing and upon cooling after being subjected to slow firing conditions. An expansion of specimen caused by firing is reported as a positive change in linear dimension and a contraction (shrinkage) as a negative change in linear dimension. Each is presented as a percentage change.

The invention also provides a method of forming a cellular polyurethane material comprising forming a mixture of a polyol component and an isocyanate component in the presence of an inorganic component and foaming the composition to form a polyurethane foam, optionally in the presence of a blowing agent, wherein the inorganic components constitute in the range of from 20 to 60% by weight of the foamed composition and comprises:

an amount of polyol and isocyanate to provide at least 40% by weight based on the total weight of the final composition of a polyurethane; from 10% to 40% (preferably from 15 to 40%) by weight based on the total weight of the final composition of a silicate mineral filler; from 5 to 20% (preferably from 10 to 20%) by weight based on the total weight of the final composition of at least one inorganic phosphate that forms a liquid phase at a temperature of no more than 800° C.; and from 0.1% to 10% (preferably from 0.5% to 10% and most preferably from 1 to 5%) by weight based on the total weight of the final composition of a heat expandable solid material.

Typically at least the major portion of the inorganic components are mixed with the polyol component. Generally it is preferred to include a substantial proportion of the inorganic components in the polyol portion. The isocyanate is then added as the last component. The polyol and isocyanate components are then allowed to react and foam due to carbon dioxide released during the reaction. Finally, the reaction causes the foam to stabilize and set. Combination and foaming of the compositions may be carried out using equipment and procedures known in the art. The polyol component containing the inorganic components is preferably agitated to maintain a consistent dispersion during the process of combining the isocyanate and polyol components.

The foam may be formed in a suitable mould to form the desired shape or continuous profile of polyurethane articles of the invention. Alternatively the polyurethane foam may be formed in situ by combining the polyol and isocyanate components contemporaneously with placement of the composition.

The polyurethane foam composition of the invention may, for example, be in the form of a seal, coating, block, rod, strip, sheet, panels or other shaped article.

The composition can be used for gap filling, thermal insulation and fire barrier applications. Examples of such applications include gap filling for access spaces in structures, gap-filling in wall penetrations for pipes and ducts, gap filling between panels, expansion joints, thermal insulation for ducts and pipes, door cores, seals in various applications, coatings on building panels and barrier coatings on various applications.

The invention will now be described with reference to the following examples. It is to be understood that the examples are provided by way of illustration of the invention and that they are in no way limiting to the scope of the invention.

EXAMPLES

Method of Preparation

Example materials were made by adding the filler mixture comprising of silicate mineral, inorganic phosphate and heat expandable solid to the polyol to form a mixture. The mixture was heated to 45-55° C. prior to reaction with the MDI. The MDI based polyurethane foam system used in all examples (referred to as PU foam system) has an NCO index of 95-105 and is based on the following:

| | | Parts per hundred polyol (php) |
|---|---|---|
| Polyol | Voranol Voractiv VV7010 (Dow) molecular weight 3000 g/mol, functionality 3 hydroxyl number (OH #) 55.0-58.0 mg KOH/g | 100.00 |
| MDI | Suprasec 7114 MDI prepolymer (Huntsman) isocyanate (NCO) value % by wt 18, functionality 2.03 | 40.00-46.00 |
| Water | Tap water | 0.80-1.00 |
| Catalyst | Tin Octoate (Sigma-Aldrich, 95% purity) | 0.30-0.50 |
| Surfactant | Niax Silicone L-626 (Momentive Performance Materials) | 0.05-0.20 |

The amount of fillers added to the polyurethane system was from 30 to 50% wt. Initially, the required amount of fillers was added to the polyol and mixed for about 3 to 5 minutes until a smooth paste consistency was achieved. Auxiliary components such as water, cell stabilising surfactants and catalyst were added to the polyol-filler mixture prior to the addition of the isocynate and stirred for 3 mins. The required amount of isocyanate was then added and stirred until an opaque, cream-like mixture was obtained (between 20 seconds to 40 seconds depending on filler level). The mixture was allowed to rise and set at standard laboratory conditions overnight. Samples were placed in an oven for 24 hours at 40° C. for complete curing.

Dimensional Stability (Shrinkage Tests):

The amount of dimensional change caused by exposure of a material to high temperature was determined by measuring the dimensions of the samples before and after heating to 750±50° C. or 1000±50° C. in a muffle furnace at a rate of 13° C./min. The samples were maintained at the maximum temperature for 5 minutes before taking them out of the furnace. Three samples were tested for each data point. Their nominal size (height×width×length) was 15×15×30 mm.

Compressive Strength Tests:

The compressive strength of the ceramic foams formed by the pyrolysis of the polyurethane based foams was determined using some guidelines taken from ASTM D1621-00. Ceramic foams of dimensions 30×50×50 mm were used and at least 2 replicates tested for each data point. The height of the samples was parallel to the foam rise direction. The crosshead speed was 3.0 mm/min. The load at 10% deformation was used to calculate the compressive strength.

A correlation was developed between compressive strength and tactile testing.

| | Descriptor | | | |
|---|---|---|---|---|
| | Weak | Mod Strong | Strong | Very Strong |
| Strength kPa | <10 | 10-20 | 20-30 | >30 |

Examples 1 to 4

Polyurethane foams of Examples 1 to 4 were prepared containing total filler quantities of 30%, 35%, 40% and 50% by weight of the total composition using the general procedure set out above and amounts of expandable graphite in the range of from 2 to 3% by weight with the components shown in Table 1.

The strength of the ceramic formed on exposure to 1000±50° C. and the change in dimensions of samples of each composition were determined in accordance with the above procedures and the results are reported in Table 1.

TABLE 1

| | Ex. 1 | Ex. 2 | Ex. 3 | Ex. 4 |
|---|---|---|---|---|
| PU foam system | 70 | 65 | 60 | 50 |
| Expandable graphite | 1.95 | 2.28 | 2.60 | 3.25 |
| Talc | 17.54 | 20.45 | 23.38 | 29.23 |
| APP | 8.75 | 10.21 | 11.67 | 14.59 |
| ZnB | 1.76 | 2.05 | 2.35 | 2.94 |
| total | 100 | 100 | 100 | 100 |

TABLE 1-continued

|  | Ex. 1 | Ex. 2 | Ex. 3 | Ex. 4 |
|---|---|---|---|---|
| Test Results at 1000 ± 50° C. | | | | |
| Density (kg/m$^3$) | 181 | 191 | 213 | 270 |
| Δ length (%) | −23.9 | −20.3 | −16.2 | −12.3 |
| Δ width (%) | −18.4 | −14.6 | −12.6 | −11.5 |
| Strength | Mod Strong | Mod Strong | Strong | Mod Strong |

Comparative Examples 1 to 3

Comparative Examples 1 to 3 were prepared to examine the performance of various filled polyurethanes similar to those of the invention but without the presence of a heat expandable solid material such as expandable graphite. The compositions were prepared using the components in the proportions by weight shown in Table 2 and samples were tested in furnaces at 750±50° C. and 1000±50° C. and the change in dimensions of the samples and strength after firing are reported in Table 2.

It was found that the linear shrinkage was over 25% at 1000±50° C., with the shrinkage increasing as the filler loading reduced.

TABLE 2

|  | CE1 | CE2 | CE3 |
|---|---|---|---|
| PU foam system | 70.00 | 65.00 | 60.00 |
| Talc | 11.40 | 13.3 | 15.20 |
| APP | 11.40 | 13.3 | 15.20 |
| ATH | 4.80 | 5.60 | 6.40 |
| ZnB | 2.40 | 2.80 | 3.20 |
| Total | 100 | 100 | 100 |
| Test Results at 750 ± 50° C. | | | |
| Density (kg/m$^3$) | 187 | 249 | 278 |
| Δ length (%) | −31.9 | −20.6 | −16.9 |
| Δ width (%) | −38.1 | −28.2 | −23.3 |
| Strength | Strong | Strong | Mod Strong |
| Test Results at 1000 ± 50° C. | | | |
| Density (kg/m$^3$) | 187 | 249 | 278 |
| Δ length (%) | −36.8 | −25.1 | −19.6 |
| Δ width (%) | −45.8 | −34.1 | −25.3 |
| Strength | Very Strong | Very Strong | Strong |

Examples 5 to 6 and Comparative Example 4

The compositions of Examples 5 to 6 and Comparative Example 4 were prepared and used to examine the effect of varying the amount of heat expandable solid material in compositions ranging from 1 to 15% by weight. The compositions were prepared using the components in the proportions by weight shown in Table 3. The samples were tested in furnaces at 750±50° C. and 1000±50° C. and the change in dimensions of the samples and their strengths after firing are reported in Table 3.

The more preferred compositions had an expandable graphite level of up to about 7% wt (80 mesh size with an onset expansion temperature of 160° C.) with up to 5% wt being optimal. At graphite levels over 10% the residue, when heated up to 750° C., is very weak and fluffy and collapsed when heated up to 1000° C.

Expandable graphite of smaller particle size (more than 80 mesh, less expansion per gram) is believed to be more suited at amounts up to 10% wt but smaller particles are generally not as readily available.

The optimal level of heat expandable solid material is highly dependent on the expansion ratio which in turn is dictated by the particle size and the expansion temperature.

The preferred expansion temperature is between about 160° C. to about 220° C. as it is preferred that the expandable graphite expand during the combustion process prior to (but near) complete polymer degradation to retain its net shape/dimensions.

In the case of particles of expandable graphite of 50 mesh size and larger the content is preferably up to 5% by weight of the final foam composition. It is preferred that the expandable graphite is of particle size no coarser than 80 mesh size. Coarser particles also typically reduce the strength of the ceramic residue, particularly at high temperatures of about 1000° C. or more. The structure contained larger and less uniform pores and was weaker.

TABLE 3

|  | Ex. 5 | Ex. 6 | CE4 |
|---|---|---|---|
| PU foam system | 50 | 50 | 50 |
| Expandable graphite | 1 | 5 | 15 |
| Talc | 32 | 29.20 | 22.25 |
| APP | 14 | 12.80 | 9.75 |
| ZnB | 3 | 3.00 | 3.00 |
| Total | 100 | 100 | 100 |
| Test Results at 750 ± 50° C. | | | |
| Density (kg/m$^3$) | 304 | 303 | 322 |
| Δ length (%) | −9.7 | +10.9 | +58.5 |
| Δ width (%) | −10.2 | +13.0 | +57.3 |
| Strength | Mod strong | Mod strong | Weak |
| Test Results at 1000 ± 50° C. | | | |
| Density (kg/m$^3$) | 308 | 304 | 322 |
| Δ length (%) | −12.5 | +3.0 | Collapsed into powder |
| Δ width (%) | −12.6 | −0.1 | |
| Strength | Mod strong | Strong | NA |

Comparative Example 5

A two part polyurethane foam that purports fire blocking capabilities was prepared using the components and the proportions by weight shown in Table 4. The sample was tested in furnaces at 1000±50° C. and the change in dimensions of the sample and its strength after firing is reported in Table 4.

TABLE 4

|  | CE5 |
|---|---|
| Aptane P274 polyol component | 32.99 |
| Aptane B900 MDI | 39.58 |
| Water | 0.33 |
| Antiblaze 80 TCPP | 11.5 |
| Kaolin Polestar 200R | 8.75 |
| Expandable graphite | 1.13 |
| Hollow silicate beads E-spheres SLG | 5.09 |
| APP Exolit AP750 | 0.58 |
| Calcium stearate | 0.05 |
| Total | 100 |
| Test Results at 1000 ± 50° C. | |
| Density (kg/m$^3$) | 110 |
| Δ length (%) | −26.3 |

TABLE 4-continued

|  | CE5 |
|---|---|
| Δ width (%) | −24.3 |
| Strength | NA |

It was not possible to measure the strength of the residue due to the lack of any coherent structure. It fell apart under its own weight.

Examples 7 to 8

The compositions of Examples 7 and 8 were prepared and used to provide for examples using a heat expandable solid material other than expandable graphite, here vermiculite. The compositions were prepared using the components in the proportions by weight shown in Table 5 and samples were tested in furnaces at 1000±50° C. and the change in dimensions of the samples and strength after firing are reported in Table 5.

When wollastonite is the silicate mineral, samples containing 10% by weight vermiculite showed similar dimensional stability compared to those containing 3.25% by weight expandable graphite.

TABLE 5

|  | Ex. 7 | Ex. 8 |
|---|---|---|
| PU foam system | 50.0 | 50.0 |
| Expandable graphite | 0 | 3.25 |
| Vermiculite | 10.0 | 0 |
| Wollastonite | 25.0 | 29.22 |
| APP | 12.50 | 14.59 |
| ZnB | 2.50 | 2.94 |
| Total | 100 | 100 |
| Test Results at 1000 ± 50° C. | | |
| Density (kg/m$^3$) | 260 | 283 |
| Δ length (%) | −5.2 | +7.9 |
| Δ width (%) | −2.6 | +8.4 |
| Strength | Strong | Strong |

Examples 9 to 12 and Comparative Examples 6 and 7

The compositions of Examples 9 to 12 and Comparative Examples 6 and 7 were prepared and used to examine the effect of varying the silicate mineral levels in compositions from 3 to 44% by weight. The compositions were prepared using the components in the proportions by weight shown in Table 6 and samples were tested in furnaces at 750±50° C. and 1000±50° C. and the change in dimensions of the samples and strength after firing are reported in Table 6.

Samples containing from 10% to 36% by weight of the total composition of silicate mineral provided reasonable shrinkage and strength. Samples with less than 10% silicate mineral had poor strength and more than 40% silicate reduced the proportion of flux resulting in very weak residues.

In Example 12 wollastonite was found to significantly improve the dimensional stability as well as the residual strength. The structure of the ceramic of Example 12 was examined using a scanning electron microscope at 40× magnification and found to provide an array of pores defined by an interconnecting network of needles and the resulting structure had very good retention of dimensions and good strength.

TABLE 6

|  | CE6 | Ex. 9 | Ex. 10 | Ex. 11 | CE7 | Ex. 12 |
|---|---|---|---|---|---|---|
| PU foam system | 49.15 | 49.57 | 50.02 | 51.25 | 49.15 | 50.02 |
| Expandable graphite | 3.05 | 3.03 | 3.00 | 1.95 | 3.05 | 3.00 |
| Talc | 3.05 | 10.09 | 24.99 | 36.07 | 43.73 | — |
| Wollastonite | — | — | — | — | — | 24.99 |
| APP | 20.34 | 15.13 | 14.99 | 9.75 | 4.07 | 14.99 |
| ATH | 20.34 | 18.15 | 3.00 | 0 | 0 | 3.00 |
| ZnB | 4.07 | 4.03 | 4.00 | 0.97 | 0 | 4.00 |
| Total | 100 | 100 | 100 | 100 | 100 | 100 |
| Test Results at 750 ± 50° C. | | | | | | |
| Density (kg/m$^3$) | 333 | 336 | 294 | 266 | 288 | 300 |
| Δ length (%) | +4.8 | +4.0 | +1.0 | +0.9 | +4.9 | +5.4 |
| Δ width (%) | +5.7 | +3.3 | −0.3 | −4.1 | +2.4 | +6.4 |
| Strength | Weak | Mod Strong | Mod Strong | Mod Strong | Weak | Strong |
| Test Results at 1000 ± 50° C. | | | | | | |
| Density (kg/m$^3$) | 333 | 336 | 294 | 266 | 288 | 300 |
| Δ length (%) | −4.5 | −1.5 | −3.0 | −0.7 | +0.9 | +3.9 |
| Δ width (%) | −2.7 | +3.1 | −6.3 | −3.5 | −1.0 | +3.8 |
| Strength | Weak | Weak | Strong | Mod Strong | Weak | Very Strong |

Examples 13 to 15 and Comparative Examples 8 and 9

The compositions of Examples 13 to 15 and Comparative Examples 8 and 9 were prepared and tested to examine the effect of varying the proportion of APP on the dimensional stability and strength of the ceramic residue formed under fire conditions. The compositions were prepared using the components in the proportions by weight shown in Table 7 and samples were tested in furnaces at 750±50° C. and 1000±50° C. and the change in dimensions of the samples and strength after firing are reported in Table 7.

At a level of 2% APP the ceramic residue formed is of very poor strength. At 30% APP the composition exhibits dramatic shrinkage particularly at higher temperature of 1000±50° C.

TABLE 7

|  | CE8 | Ex. 13 | Ex. 14 | Ex. 15 | CE9 |
|---|---|---|---|---|---|
| PU foam system | 50 | 50 | 50 | 50 | 50 |
| Expandable graphite | 3 | 3 | 3.25 | 3 | 3 |
| Talc | 41 | 33 | 29.23 | 23 | 13 |
| APP | 2 | 10 | 14.59 | 20 | 30 |
| ZnB | 4 | 3 | 2.93 | 4 | 4 |
| Total | 100 | 100 | 100 | 100 | 100 |
| Test Results at 750 ± 50° C. | | | | | |
| Density (kg/m$^3$) | 278 | 303 | 262 | 302 | 309 |
| Δ length (%) | +4.9 | +1.0 | +2.5 | −2.4 | +2.7 |
| Δ width (%) | +6.3 | +3.6 | −0.5 | −1.1 | +3.4 |
| Strength | Weak | Mod Strong | Mod Strong | Strong | Strong |
| Test Results at 1000 ± 50° C. | | | | | |
| Density (kg/m$^3$) | 283 | 300 | 263 | 300 | 315 |
| Δ length (%) | +4.3 | +1.2 | −2.2 | +3.2 | −35.2 |
| Δ width (%) | +2.6 | −0.1 | −3.3 | +2.4 | −34.5 |
| Strength | Weak | Mod Strong | Mod Strong | Strong | Strong |

Examples 16 to 19

The compositions of Examples 16 to 19 examine the effect of variation in the amount of zinc borate (ZnB) on the change in volume under fire conditions and the strength of the resulting ceramic residue. The composition components in amounts by weight are shown in Table 8. The dimensional change caused by firing in a furnace at 750±50° C. was measured and the results are reported in Table 8.

TABLE 8

|  | Ex. 16 | Ex. 17 | Ex. 18 | Ex. 19 |
| --- | --- | --- | --- | --- |
| PU foam system | 50 | 50 | 50 | 50 |
| Expandable graphite | 3.25 | 3.25 | 3.05 | 3.45 |
| Talc | 29.22 | 29.22 | 27.44 | 31.05 |
| APP | 14.59 | 14.59 | 13.70 | 15.5 |
| ZnB | 2.94 | 0 | 5.81 | 0 |
| Glass frit | 0 | 2.94 | 0 | 0 |
| Total | 100 | 100 | 100 | 100 |
| Test Results at 750 ± 50° C. | | | | |
| Density (kg/m$^3$) | 282 | 310 | 309 | 279 |
| Δ length (%) | −0.9 | 7 | 3.5 | +2.6 |
| Δ width (%) | −0.3 | 3.5 | 5.2 | −1.0 |
| Strength | Strong | Strong | Strong | Strong |

The compositions containing zinc borate (Examples 16 and 18) showed less distortion under fire conditions, but the addition of zinc borate is not essential for minimising shrinkage or achieving required compressive strength.

The invention claimed is:

1. A cellular polyurethane foam composition for forming a cellular ceramic under fire conditions, the composition comprising:
   at least 40% by weight based on the total weight of the composition of a polyurethane;
   from 15% to 40% by weight based on the total weight of the composition of silicate mineral filler;
   from 5% to 20% by weight based on the total weight of the composition of at least one inorganic phosphate that forms a liquid phase at a temperature of no more than 800° C.;
   from 1% to 5% by weight based on the total weight of the composition of heat expandable graphite; and
   wherein the total proportion of inorganic components constitutes in the range of from 20% to 60% by weight of the total composition and the density of the polyurethane foam is in the range of from 150 to 500 kilograms per cubic meter.

2. A cellular polyurethane foam according to claim 1 wherein said at least one inorganic phosphate comprises ammonium polyphosphate (APP) present in an amount of from 5% to 20% by weight based on the total weight of the composition.

3. A cellular polyurethane foam according to claim 1 wherein the silicate mineral is talc and/or wollastonite.

4. A cellular polyurethane foam according to claim 2 wherein the APP constitutes in the range of from 10% to 15% by weight of the total polyurethane foam composition.

5. A cellular polyurethane foam according to claim 1 wherein zinc borate is present in an amount of from 1% to 10% by weight of the total composition.

6. A cellular polyurethane foam according to claim 1 wherein the ceramic product formed after exposure of the cellular polyurethane foam at an elevated temperature of 1050° C. has a compressive strength of at least 10 kPa.

7. A cellular polyurethane foam according to claim 1 wherein a rectangular test specimen of the polyurethane foam, when exposed to firing conditions comprising heating to 750±50° C. or 1000±50° C. in a furnace at a rate of 13° C./min undergoes a change in linear dimension along the length of the specimen of less than 20%.

8. A method of forming a cellular polyurethane material comprising forming a mixture of a polyol component and an isocyanate component in the presence of inorganic components and foaming the composition to form a polyurethane foam, optionally in the presence of a blowing agent, wherein the inorganic components constitute in the range of from 20 to 60% by weight of the polyurethane foam composition and wherein the polyurethane foam composition comprises:
   an amount of polyol and isocyanate to provide at least 40% by weight based on the total weight of the polyurethane foam composition of a polyurethane;
   from 15% to 40% by weight based on the total weight of the polyurethane foam composition of a silicate mineral filler;
   from 5% to 20% by weight based on the total weight of the polyurethane foam composition of at least one inorganic phosphate that forms a liquid phase at a temperature of no more than 800° C.; and
   from 1% to 5% by weight based on the total weight of the polyurethane foam composition a heat expandable graphite;
   wherein the density of the polyurethane foam is in the range of from 150 to 500 kilograms per cubic meter.

9. A method according to claim 8 wherein said at least one inorganic phosphate comprises ammonium polyphosphate present in an amount of from 5% to 20% by weight based on the total weight of the final composition.

10. A method of forming a cellular polyurethane material according to claim 8 wherein at least a major portion of the inorganic components is mixed with the polyol component prior to foaming.

11. A polyurethane foam article comprising the polyurethane foam composition of claim 1 in the form of a seal, coating, block, rod, strip, sheet, or panel.

12. A gap filling, thermal insulation, or fire barrier comprising the polyurethane foam article of claim 11.

13. A cellular polyurethane foam composition for forming a cellular ceramic under fire conditions, the composition comprising:
   at least 40% by weight based on the total weight of the composition of a polyurethane;
   from 15% to 40% by weight based on the total weight of the composition of silicate mineral filler;
   from 5% to 20% by weight based on the total weight of the composition of at least one inorganic phosphate that forms a liquid phase at a temperature of no more than 800° C.;
   from 1% to 5% by weight based on the total weight of the composition of expandable graphite; and
   wherein the total proportion of inorganic components constitutes in the range of from 20% to 60% by weight of the composition, the amount of silicate mineral filler is at least 50% by weight based on the total weight of inorganic filler content, the amount of at least one inorganic phosphate is at least one fourth by weight of inorganic filler content, and the density of the polyurethane foam is in the range of from 150 to 500 kilograms per cubic meter.

14. A polyurethane foam article comprising the polyurethane foam composition of claim 1 in the form of a shaped article.

15. A gap filling, thermal insulation, or fire barrier comprising the shaped, polyurethane foam article of claim 14.

* * * * *